United States Patent [19]

Berger et al.

[11] Patent Number: 4,516,648
[45] Date of Patent: May 14, 1985

[54] CHILD'S RIDE-ON TOY WITH REVERSING DRIVE FOR REAR WHEELS

[75] Inventors: Hans S. Berger, Plainville; Frank Mercurio; Norbert L. Reiner, both of Wallingford, all of Conn.

[73] Assignee: Coleco Industries, Inc., West Hartford, Conn.

[21] Appl. No.: 488,050

[22] Filed: Apr. 25, 1983

[51] Int. Cl.³ ............................................. B62D 11/04
[52] U.S. Cl. ................................. 180/6.66; 74/354; 74/355; 180/210; 446/442
[58] Field of Search ................... 180/6.66, 6.2, 210, 180/214; 46/263, 212; 74/352, 354, 355

[56] References Cited

U.S. PATENT DOCUMENTS

| | | | |
|---|---|---|---|
| 56,771 | 7/1866 | Mason | 74/354 X |
| 215,296 | 5/1879 | Reid | 100/219 |
| 252,504 | 1/1982 | Otto | 180/6.2 X |
| 264,930 | 9/1882 | Conradson | 416/9 |
| 322,797 | 7/1885 | Coleman | 74/355 |
| 379,996 | 3/1888 | Smith et al. | 74/355 |
| 2,049,661 | 4/1934 | Pederson | 74/355 |
| 2,321,820 | 8/1941 | Kachel | 242/215 |
| 2,917,122 | 12/1959 | Quisenberry | 180/210 |
| 3,684,046 | 8/1972 | Begleiter | 180/214 |
| 3,763,945 | 10/1973 | Danielson | 180/6.66 |
| 3,842,928 | 10/1974 | Kishi | 180/214 |

*Primary Examiner*—David M. Mitchell
*Assistant Examiner*—Mitchell J. Hill

[57] ABSTRACT

A child's motor powered vehicle utilizes a unidirectional electric motor supported on a drive shaft which carries at its ends drive members which are engageable with either one of a pair of radially spaced drive surfaces on the drive wheels. Control levers support the drive shaft adjacent its ends and are pivotally supported on the vehicle so that they may effect movement of the drive shaft end portions and the drive elements from one drive surface to another to effect a reversal in the direction of rotation of the drive wheels. The drive surfaces are conveniently provided by axial walls of a concentric channel on the inner face of the drive wheels.

19 Claims, 11 Drawing Figures

CHILD'S RIDE-ON TOY WITH REVERSING DRIVE FOR REAR WHEELS

BACKGROUND OF THE INVENTION

In recent years, there has been increasing use of battery-powered motors to drive children's ride-on vehicles. Some of these vehicles use motors with reversible polarity and switches, or with gearing, to effect reversible rotation of the drive wheels, and these approaches generally increase costs and frequently present areas of failure in use.

It is an object of the present invention to provide a novel battery-powered child's vehicle which utilizes a unidirectional motor and a novel drive assembly to effect reversible rotation of the drive wheels.

It is also an object to provide such a vehicle in which steering is effected by independent control of the direction of rotation of two drive wheels.

Another object is to provide such a vehicle utilizing and independently reversible drive means for the rear wheels and a centerline front wheel which is readily pivotable about a vertical axis.

Yet another object is to provide such a vehicle which may be fabricated in large measure from easily formed and economical synthetic resin parts to provide a rugged and reasonably long-lived assembly.

SUMMARY OF THE INVENTION

It has now been found that the foregoing and related objects may be readily attained in a child's vehicle wherein a body is adapted to seat a child with its legs supported thereon, and a first wheel assembly is mounted by suitable means on the body for pivoting about a vertical axis. An axle is supported on the body in spaced relationship to the first wheel assembly, and rotatably supports a pair of drive wheels each having a drive portion including a pair of radially spaced drive surfaces extending coaxially about the axle. Also supported on the body in spaced relationship to the axle and generally parallel thereto in its at rest position is a drive shaft which has on its ends drive members for rotation therewith adjacent the drive surfaces. The drive elements and drive surfaces are engageable to effect driving engagement therebetween upon surface engagement thereof.

Power means is provided for effecting rotation of the drive shaft in one direction of rotation, and a pair of control levers extend upwardly from the body and are pivotably mounted thereon adjacent their lower ends. Each control lever is engageable with an end portion of the drive shaft, and pivoting of the lever from a first position to a second position effects movement of the respective drive shaft end portion and the drive element carried thereby from engagement with one drive surface of the adjacent wheel and into engagement with the other drive surface thereof. As a result, pivoting of the control levers from one position to another will effect a change in direction of rotation of that wheel, and positioning of the two control levers to effect engagement of the drive elements with opposite drive surfaces on the rear wheels will effect rotation of the wheels in opposite directions and turning of the vehicle. Moreover, positioning of the control levers to effect engagement of the drive elements with the same drive surfaces will effect generally straight line motion of the vehicle forwardly and rearwardly.

Desirably, the first wheel assembly is located in the front of the vehicle and the drive wheels and axle are located in the rear of the vehicle. The first wheel assembly includes a vertically extending post, at least one wheel supported for rotation thereon, and means journalling the post in the body for rotation about the vertical axis. Preferably, the post is disposed centrally of the width of the vehicle and in the front portion thereof.

In its preferred aspect, the power means includes an unidirectional electric motor supported on the drive shaft and engaged therewith to effect its rotation, and the electric motor and drive shaft are supported by the control levers. The drive wheels each have a drive portion on the inner face thereof including a concentric annular channel extending axially about the axle and defined by a base wall and opposed axially extending walls providing the drive surfaces. The drive members are disposed in the channels and are of a diameter less than the width of the channel. Moreover, the axially extending walls of the channel have axially extending teeth about their periphery and the drive members have cooperatively dimensioned and configured axially extending teeth about their periphery. To effect normal forward movement of the vehicle, the assembly preferably includes means biasing the control levers into the first position.

DETAILED DESCRIPTION OF THE ILLUSTRATED EMBODIMENT

Figure 1:
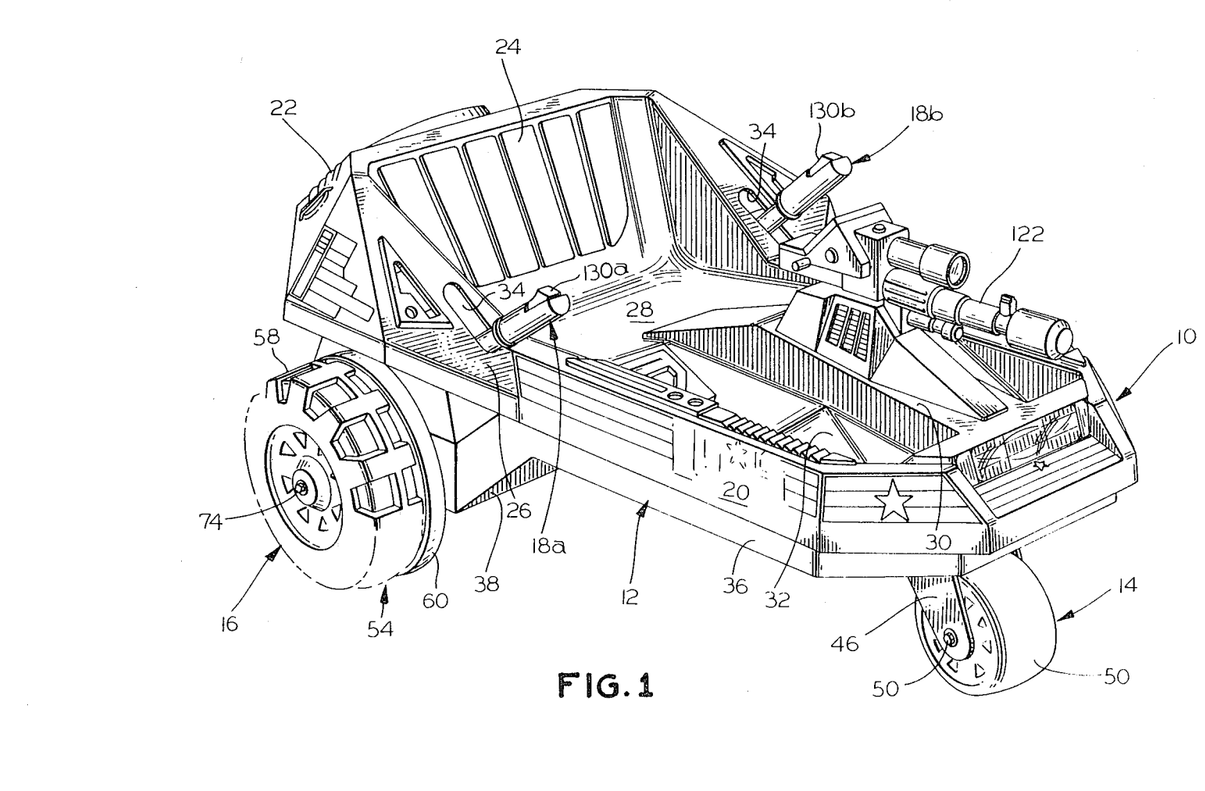
FIG. 1 is a perspective view of a vehicle embodying the present invention.

Turning now in detail to FIG. 1 of the attached drawings, therein illustrated is a child's ride-on vehicle embodying the present invention and which includes a body comprised of the top member generally designated by the numeral 10 and undercarriage generally designated by the numeral 12, a front wheel assembly generally designated by the numeral 14, a rear wheel assembly generally designated by the numeral 16, and control levers generally designated by the numerals 18a and 18b. Not seen in this view is the drive assembly which will be described hereinafter.

The top member 10 has a peripheral skirt or sidewall 20, and the top wall is configured to provide a rear deck 22, seat back 24, inclined side extensions 26, seat 28 therebetween, gun pedestal 30, and foot recesses 32. The side extensions 26 have elongated slots 34 therein through which the control levers 18a and 18b extend.

The undercarriage 12 has an elongated front portion 36, a depending housing portion 38, and a generally flat rear portion 40. The housing portion 38 is formed with a series of recesses 42 in its upper surface to seat various elements of the assembly, as will be described more fully hereinafter.

The top member 10 is secured to the undercarriage 12 by a multiplicity of fasteners (not shown) spaced thereabout.

The front wheel assembly 14 is of a caster-type construction and includes a vertically extending post comprised of an inverted U-shaped fork 46 which has a shaft (not shown) extending vertically upwardly from its web portion (not shown) and journalled in the undercarriage 12 for free relative rotation about a vertical axis. The front wheel 48 is rotatably mounted on the front axle 50 which is supported in the legs of the fork 46.

Figure 8:
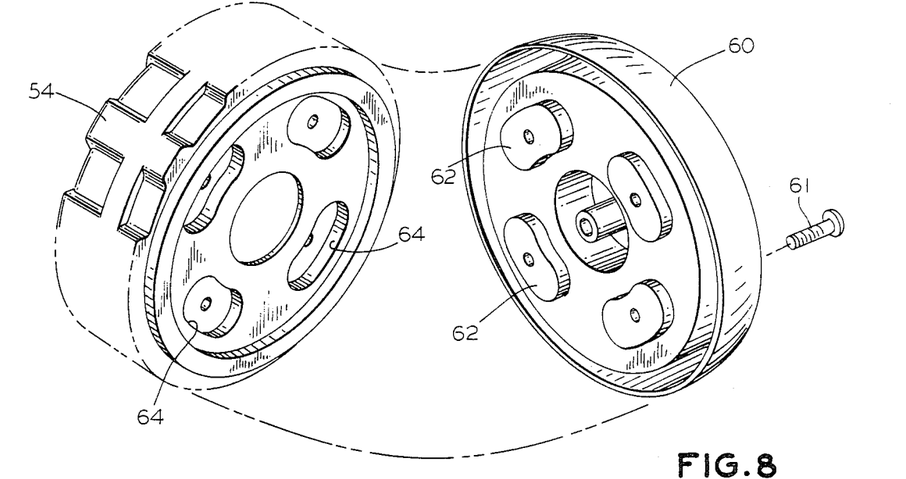
FIG. 8 is an exploded view of a rear wheel.

The rear wheel assembly 16 includes an axle 52 which extends through the lower section of the housing portion 38 of the undercarriage 12, the rear wheel outer shell 54 and inner shell 60 which are supported for rotation thereon, and rear wheel covers 56 which are biased outwardly on the axle 52 from the undercarriage 12 against the wheels inner shell 60 by the compression springs 57.

The rear wheel outer shell 54 simulates the appearance of a vehicle tire and mounting rim disc, and are locked onto the axle 52 by the cap nuts 74. The inner shell 60 and outer shell 54 have cooperating bosses 62 and recesses 64 on their opposed faces through which extend fasteners 61 to interlock them against inner shell 60 is configured to provide a central annular post or ring 66 and a circumferential ring 68 defining an annular recess or channel 70 therebetween with a base wall and radially spaced opposed walls. The opposed surfaces of the rings 66,68 are provided with axially extending teeth 72a about the periphery thereof.

Figure 9:
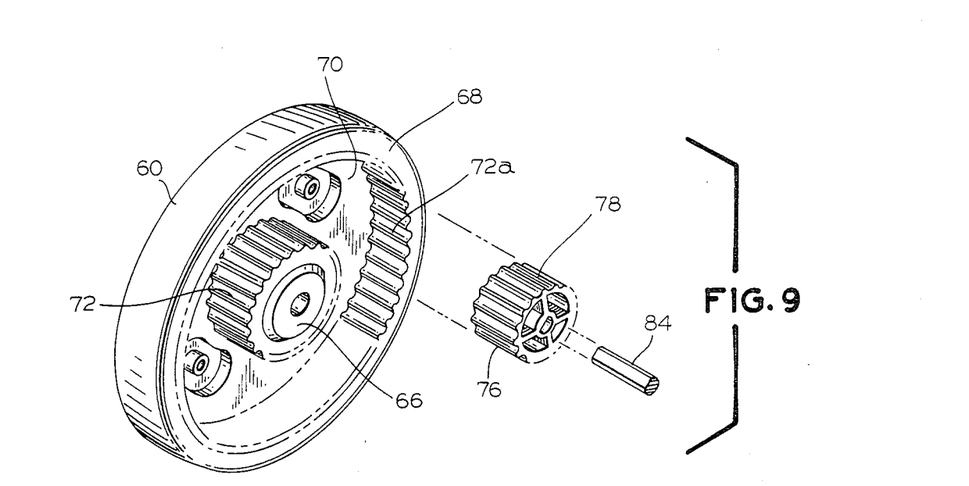
FIG. 9 is an exploded perspective view of the drive gear, the drive portion of a rear wheel, and a fragmentary portion of the drive shaft.

Disposed in the recesses 70 of the inner shell 60 are drive members or gears 76 which are of lesser diameter than the radial length of the recess 70. In the embodiment of FIG. 9, the drive member 76 is of pinion gear configuration with axially extending teeth 78 about the circumference thereof which teeth are dimensioned and configured to mesh with the teeth 72, 72a of the rings 66,68.

Figure 10:
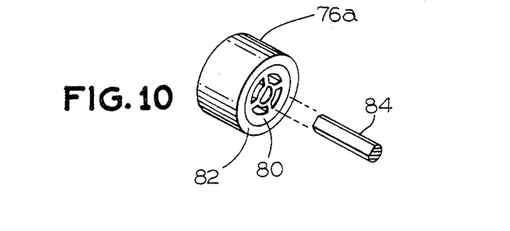
FIG. 10 is perspective view of an alternate embodiment of drive gear and a fragmentary portion of the drive shaft.

In the embodiment of FIG. 10, the drive member 76a has a rigid core 80 and a circumferential portion 82 of resiliently compressible material for engagement with the teeth 72, 72a of the rings 66,68. This resilient portion 82 may be formed with gear teeth as in the embodiment of FIG. 9, or it may rely upon deformation during contact to utilize frictional engagement alone.

Figure 2:
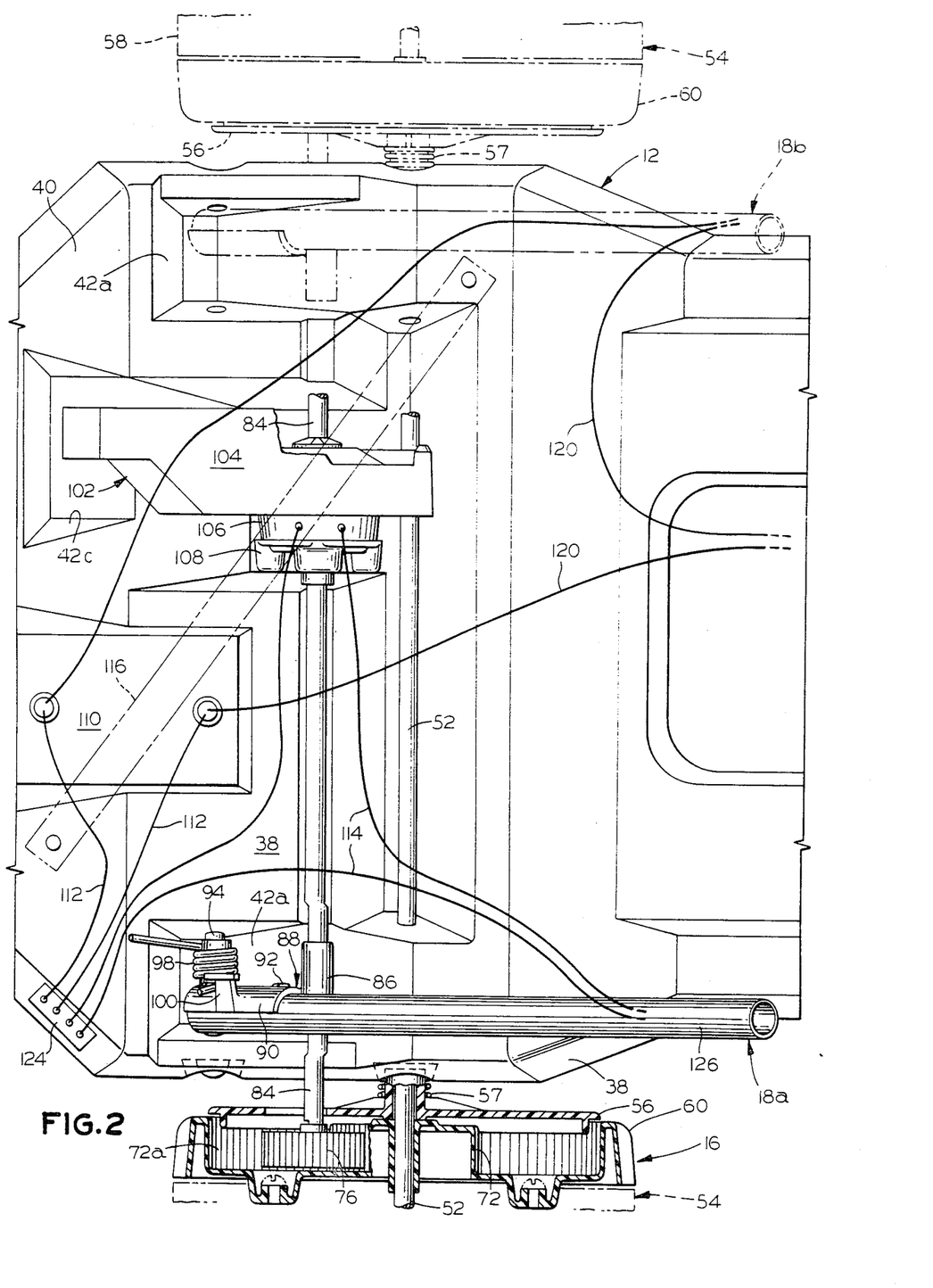
FIG. 2 is a fragmentary plan view to an enlarged scale of the rear end portion with the body top member removed and with other portions broken away for clarity of illustration.

The drive members 76 are supported on the ends of the drive shaft 84 for rotation therewith, and the shaft 84 extends through and is rotatable in bearing sleeves 86 which are formed as a portion of the socket members generally designated by the numeral 88. Socket portions 90 on the socket members 88 define a cylindrical recess in which is seated the lower end of the control levers 18a and 18b.

Figure 3:
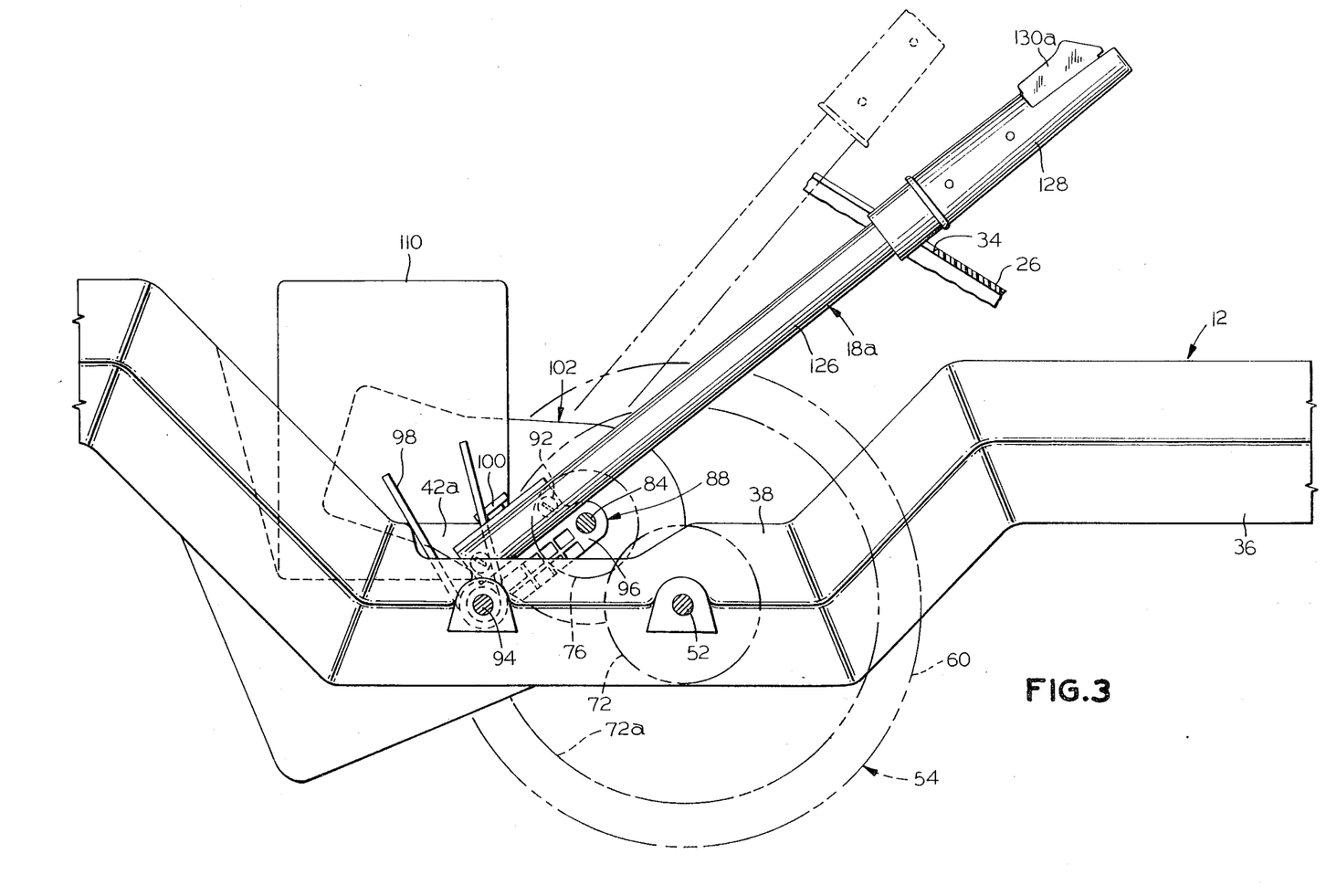
FIG. 3 is a fragmentary, partially diagrammatic side elevational view of the rear wheel and drive assembly with one of the control levers shown in full line in its at rest position and in phantom line in its second pivoted position.

Fasteners 92 extend through aligned apertures in the lower portion of the levers 18a and 18b and in the socket portion 90 to secure these members in assembly. The socket members 88 and levers 18a and 18b are disposed in part within recesses 42a in the upper surface of the undercarriage 12, and are pivotably mounted therein by pivot shafts 94 which extend through the body portion 96 of the socket members 88 and are journalled in the sidewalls of the undercarriage 12 defining the recesses 42a. A coil spring 98 is seated on each pivot shaft 94 and acts between the rear wall of the recess 42a and a shoulder 100 on the socket member 88 and thereby biases the control lever 18a and 18b forwardly of the vehicle.

The end portions of the drive shaft 84 extend through slots in the gear covers 56 to protect the gear teeth from intrusion of large objects which might injure them and also to ensure that a child will not be able to insert a finger into the space between the gear teeth and the drive member.

Supported on the drive shaft 84 intermediate the width of the underbody 12 is the electric motor drive assembly generally designated by the numeral 102 which includes a housing 104 containing a motor (not shown) that rotates the gear 106 which engages the gear 108. The latter gear is fixed on the drive shaft 84 and thus effects rotation of the shaft 84 and thereby the drive member 76 and rear wheels 54. Although the housing 104 and gear 106 are supported by the drive shaft 84 and move therewith in response to movement of the central levers 18a and 18b, they are also free to pivot about it, thus accommodating the movement of the drive shaft 84. The amount of pivoting of the drive assembly 102 about the drive shaft 84 is limited by abutment of the housing 104 against the axle 52 and by the strap 116. Moreover, the housing 104 is disposed in registry with, and partially seated in, recess 42b of the undercarriage 12.

Electrical energy is supplied to the motor drive assembly 102 by a storage battery 110 through conductors 112 which connect to a terminal board 124 on the exterior of the undercarriage 12, and conductors 114 which extend from the terminal board to the drive assembly 102 with the switch 118 in the control lever 18a being disposed in one leg thereof to enable control of the operation of the motor drive assembly 102. Conductors 112 between the terminal board 124 and the battery 110 may supply recharging current when a charger (not shown) is connected to the terminal board 124. A second pair of conductors 120 supply current to the simulated gun 122 mounted on the front end of the vehicle and one leg of the pair is interrupted by a switch in the control lever 18b similar to switch 118 in the control lever 18a. The battery 110 seats in the recess 42c of the undercarriage 12 and is secured therein by the tie strap 116.

Figure 11:
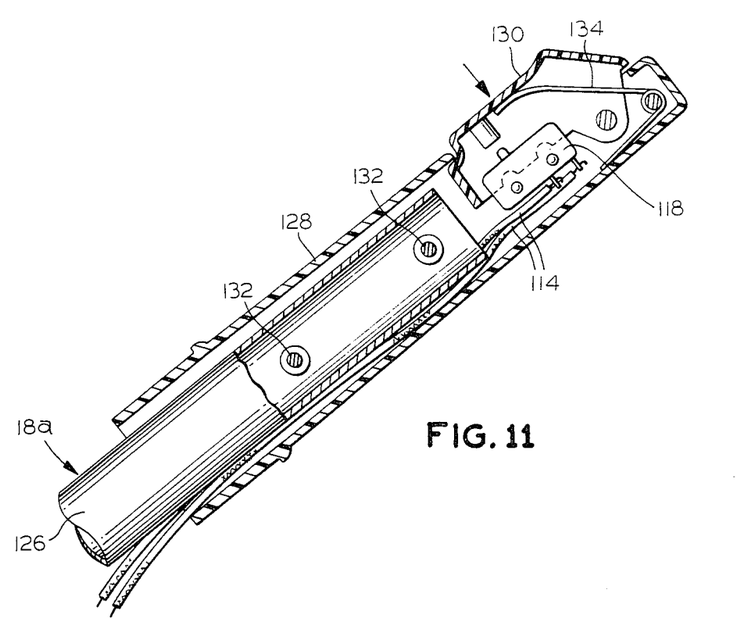
FIG. 11 is a fragmentary sectional view to an enlarged scale of one of the control levers.

As seen with respect to the control lever 18a in FIG. 11, the control levers 18a and 18b comprise elongated tubular members 126 with molded plastic handle grips 128 at their outer ends. The grips 128 mount the pivotable triggers 130 which actuate the switches 118 which are supported within the grips. The handle grips 128 are secured to the tubular members 126 by fasteners 132, and the triggers 130 are biased outwardly of the grips 128 by the torsion springs 134.

Figure 4:
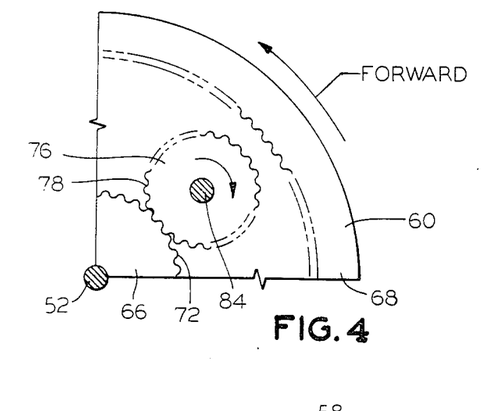
FIGS. 4 and 5 are fragmentary, partially diagrammatic elevational views of the gears on the drive shaft and rear wheel in different positions of the drive shaft and drive gear to effect rotation of that rear wheel for movement of the vehicle in the forward direction and reverse direction, respectively.

In operation of the vehicle, the child is seated on the seat 28 with its feed disposed in the foot recesses 32. To propel the vehicle forwardly and generally in a straight line, the child simply presses the trigger switch 130a on the control lever 18a which actuates the drive assembly 102 and effects rotation of the drive shaft 84 through the gears 106, 108. Because both control levers 18a or 18b are biased forwardly by the springs 98, the drive members 76 are engaged with the teeth 72 on the central post 66 of the inner shell 60 of the rear wheels 54. As the drive shaft 84 rotates, this causes the wheels 54 to rotate in the manner seen in FIG. 4 to effect movement of both wheels in the same direction and to drive the vehicle forwardly.

Figure 5:
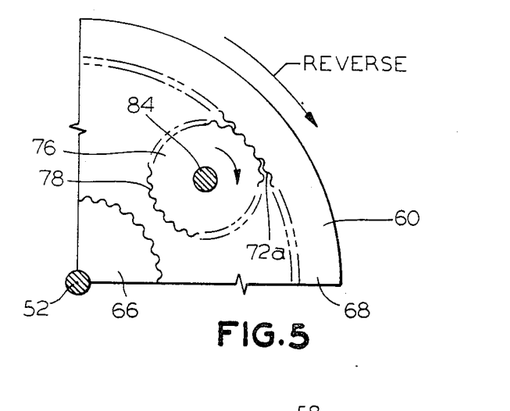
Figure 6:
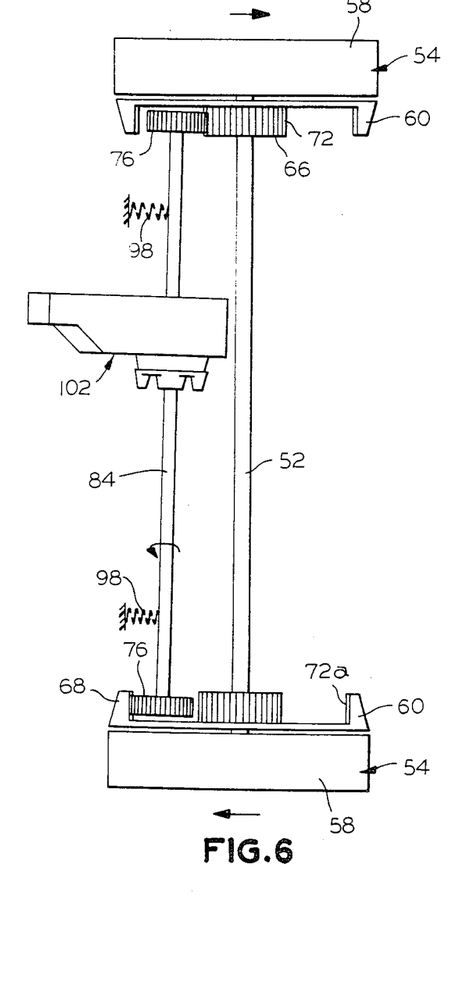
FIGS. 6 and 7 are partially diagrammatic plan views of the rear wheels and axle, and the drive shaft and drive gears showing the wheels being driven in different directions of rotation and the same direction of rotation, respectively.

To effect turning movement of the vehicle, the trigger switch 130a is depressed and the lever 18a or 18b on the side towards which the vehicle is to be turned is pulled backwards against the biasing pressure of the spring 98. This moves the drive member 76 from engagement with the teeth 72 on the central post 66 and into engagement with the teeth 72a on the outer ring 68 as seen in FIG. 5. As a result, the associated rear wheel 54 will be rotated in the reverse direction, causing the front end of the vehicle to turn in the direction of that side of the vehicle. The resultant opposite rotation of the rear wheels 54 is diagrammatically shown in FIG. 6.

Figure 7:
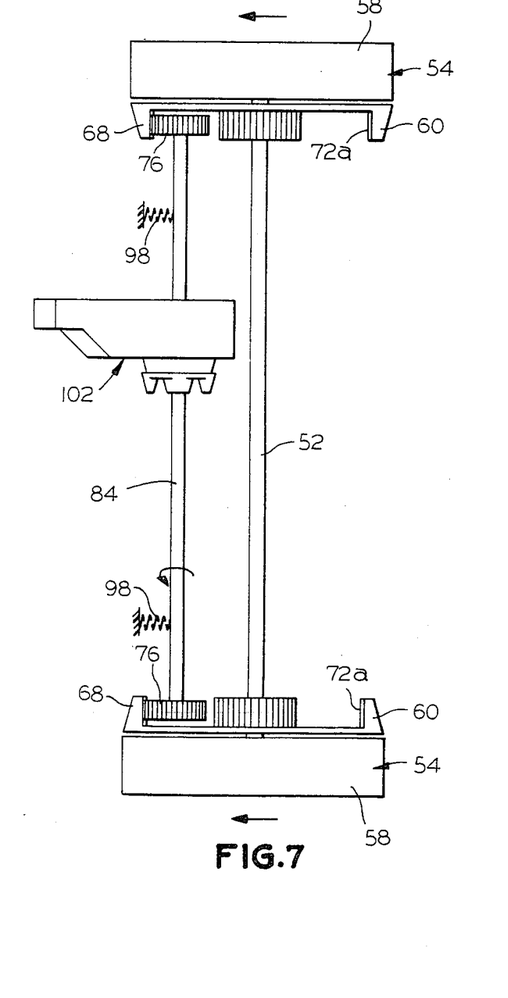

To effect rearward motion of the vehicle, the trigger switch 130a is depressed and both levers 18a and 18b are pulled rearwardly simultaneously. As a result, both drive members 76 are engaged with the teeth 72a of the outer rings 68 and rotate the wheels 54 in the reverse direction as shown diagrammatically in FIG. 7.

By varying the lever 18a or 18b which is pulled rearwardly, or by positioning of both levers forwardly or rearwardly, forward or reverse movement, and turning of the vehicle while advancing or backing, can be readily effected.

This control of motion of the vehicle is readily effected since the drive shaft 84 is supported adjacent its ends on the control levers 18, and the drive assembly 102 is carried by the drive shaft 84. As a result, the pivotal movement of a lever 18a or 18b moves that end of the shaft 84, and the drive assembly 102 retains its same orientation with respect to the drive shaft because it moves with it.

The front wheel assembly 14 is of caster-type construction, and the fork 46 pivots freely in the underbody 12 about its vertical axis so that the front wheel 48 will track the direction of movement dictated by the rear wheel assembly 16.

The child can fire the simulated gun 122 by pressing the trigger switch 130b on the lever 18b.

Most of the parts of the vehicle may be readily fabricated from synthetic resin to afford both durability and low cost, and the various parts may be assembled readily and economically.

The top member of the body in conveniently thermoformed from polyethylene although other resins such as polypropylene, ABS and impact polystyrene may also be employed. The undercarriage of the body, the front wheels and the outer shells of the rear wheels are conveniently blow molded from polyethylene although polypropylene and other resins may also be used. The inner shells of the rear wheels and the socket members are desirably injection molded from acetal resin although polycarbonate, polyamide and other wear and impact resistant resins may also be employed.

The gears of the drive assembly are desirably injected molded from polyamide or other durable, low friction resins. The drive or pinion gears disposed in the rear wheels may be also injection molded of polyamide, acetal or like resins, or preferably they may be molded as of a combination of an injection molded resiliently deformable polyurethane about a rigid polyurethane core as shown in FIG. 10, either with or without teeth, to minimize noise or chatter as the drive gear enters and leaves engagement with the rings.

The gun is readily injection molded from polypropylene or polyethylene resin, and the handle grips may be injection molded from impact styrene and ABS resins.

To effect assembly, the motor drive assembly is secured on the drive shaft, the socket members are then slid thereonto and secured thereto, and the springs are placed thereon. This subassembly is then seated on the undercarriage. The rear axle is passed through the undercarriage, and the contact levers are secured in the sockets. The springs and gear covers are placed on the rear axle, and the drive gears are placed on the drive shaft. The shells of the rear wheels are secured together and mounted on the ends of the axle. The front wheel assembly is then seated in the undercarriage, the battery is placed thereon, and the conductors are run to their several terminals and switches. The top member of the body may then be placed thereon and secured in place by the fasteners.

Thus, it can be seen from the foregoing specification and attached drawings that the battery-powered vehicles of the present invention may utilize a relatively low-cost unidirectional electric motor and a simple but highly effective drive assembly and gearing to effective reversible rotation of the drive wheels. Steering is conveniently effected by controlling the direction of rotation of the drive wheels, and a simple caster-like front wheel readily responds to this motion. Most of the parts may be fabricated readily from synthetic resin and easily assembled to provide a relatively low-cost, durable vehicle.

Having thus described the invention, We claim:

1. In a child's motor powered vehicle, the combination comprising:
   A. a body adapted to seat a child with the legs supported thereon;
   B. a first wheel assembly;
   C. means mounting said first wheel assembly on said body for pivoting about a vertical axis;
   D. an axle supported on said body in spaced relationship to said first wheel assembly;
   E. a pair of drive wheels rotatably supported on said axle, said wheels each having a drive portion on the inner face thereof including a concentric annular channel extending axially about said axle, said channel being defined by a base wall and a pair of radially spaced opposed walls providing drive surfaces extending coaxially about said axle;
   F. a drive shaft supported on said body in spaced relationship to said axle and generally parallel thereto in its at rest position;
   G. drive members on the ends of said drive shaft for rotation therewith and disposed in said channels adjacent said drive surfaces, said drive elements being of lesser dimension than said base wall of said channel, said drive elements and drive surfaces being engageable to effect driving engagement therebetween upon surface engagement thereof;

H. power means for effecting rotation of said drive shaft in one direction of rotation;

I. a pair of control levers extending upwardly of said body and pivotably mounted thereon adjacent their lower ends, said control levers each being engageable with an end portion of said drive shaft upon pivoting of said levers from a first position to a second position which effects movement of the respective drive shaft end portions and the drive elements carried thereby from engagement with one drive surface of the adjacent wheel and into engagement with the other drive surface thereof, whereby pivoting of the control levers from one position to another will effect a change in direction of rotation of that wheel and positioning of the two control levers to effect engagement of the drive elements with opposite drive surfaces on said rear wheels will effect rotation of the wheels in opposite directions and turning of the vehicle, and whereby positioning of the control levers to effect engagement of the drive elements with the same drive surfaces will effect generally straight line motion of the vehicle forwardly and rearwardly.

2. The vehicle in accordance with claim 1 wherein said first wheel assembly is located in the front of said vehicle and said drive wheels and axle are located in the rear of said vehicle.

3. The vehicle in accordance with claim 1 wherein said first wheel assembly includes a vertically extending post, at least one wheel supported for rotation thereon, and means journalling said post in said body for rotation about said vertical axis.

4. The vehicle in accordance with claim 3 wherein said post is disposed centrally of the width of said vehicle and in the front portion thereof.

5. The vehicle in accordance with claim 1 wherein said radially spaced opposed walls of said channel have axially extending teeth about the periphery thereof.

6. The vehicle in accordance with claim 5 wherein said drive members have cooperatively dimensioned and configured axially extending teeth about the periphery thereof.

7. The vehicle in accordance with claim 1 including means biasing said control levers into said first position.

8. In a child's motor powered vehicle, the combination comprising:
A. a body adapted to seat a child with the legs supported thereon;
B. a first wheel assembly;
C. means mounting said first wheel assembly on said body for pivoting about a vertical axis;
D. an axle supported on said body in spaced relationship to said first wheel assembly;
E. a pair of drive wheels rotatably supported on said axle, said wheels each having a drive portion including a pair of radially spaced drive surfaces extending coaxially about said axle;
F. a drive shaft supported on said body in spaced relationship to said axle and generally parallel thereto in its at rest position;
G. drive members on the ends of said drive shaft for rotation therewith and adjacent said drive surfaces, said drive elements and drive surfaces being engageable to effect driving engagement therebetween upon surface engagement thereof;
H. power means for effecting rotation of said drive shaft in one direction of rotation, said power means includes an unidirectional electric motor supported on said drive shaft and engaged therewith to effect its rotation;
I. a pair of control levers extending upwardly of said body and pivotably mounted thereon adjacent their lower ends, said control levers each being engageable with an end portion of said drive shaft upon pivoting of said levers from a first position to a second position which effects movement of the respective drive shaft end portions and the drive elements carried thereby from engagement with one drive surface of the adjacent wheel and into engagement with the other drive surface thereof, whereby pivoting of the control levers from one position to another will effect a change in direction of rotation of that wheel and positioning of the two control levers to effect engagement of the drive elements with opposite drive surfaces on said rear wheels will effect rotation of the wheels in opposite directions and turning of the vehicle, and whereby positioning of the control levers to effect engagement of the drive elements with the same drive surfaces will effect generally straight line motion of the vehicle forwardly and rearwardly.

9. The vehicle in accordance with claim 8 wherein said electric motor and drive shaft are supported on said control levers.

10. In a child's motor powered vehicle, the combination comprising:
A. a body adapted to seat a child with the legs supported thereon;
B. a front wheel assembly;
C. means mounting said front wheel assembly on said body for pivoting about a vertical axis;
D. a rear axle supported on said body;
E. rear wheels rotatably supported on said axle, said rear wheels each having a drive portion on the inner face thereof including a generally annular channel extending coaxially about said axle, said channels each being defined by a base wall and opposed, axially extending walls;
F. a drive shaft supported on said body in spaced relationship to said rear axle and generally parallel thereto in its at rest position;
G. drive members on the ends of said drive shaft for rotation therewith and disposed within said annular channels of said rear wheels, said drive elements being of a diameter less than the radial width of said channels, said drive elements and channel walls having cooperating surfaces to effect driving engagement therebetween upon surface engagement thereof;
H. power means for effecting rotation of said drive shaft in one direction of rotation;
I. a pair of control levers extending upwardly of said body and pivotably mounted thereon adjacent their lower ends, said control levers each being engageable with an end portion of said drive shaft upon pivoting of said levers from a first position to a second position which effects movement of the respective drive shaft end portions and the drive elements carried thereby from engagement with one axially extending wall of the channel of the adjacent rear wheel and into engagement with the other axially extending wall of said drive channel, whereby pivoting of the control levers from one position to another will effect a change in direction of rotation of that rear wheel and positioning of the two control levers to effect engagement of the drive elements with opposite walls of said channel will effect rotation of the rear wheels in opposite directions and turning of the vehicle, and whereby positioning of the control levers to effect engagement of the drive elements with the same channel walls will effect generally straight line motion of the vehicle forwardly and rearwardly.

11. The vehicle in accordance with claim 10 wherein said first wheel assembly includes a vertically extending post centrally of the width of said vehicle, at least one wheel supported for rotation thereon, and means journalling said post in said body for rotation about said vertical axis.

12. The vehicle in accordance with claim 10 wherein said power means includes an unidirectional electric motor supported on said drive shaft and engaged therewith to effect its rotation.

13. The vehicle in accordance with claim 12 wherein said electric motor and drive shaft are supported on said control levers.

14. The vehicle in accordance with claim 10 wherein said axially extending walls of said channel have axially extending teeth about the periphery thereof, and wherein said drive members have cooperatively dimensioned and configured axially extending teeth about the periphery thereof.

15. The vehicle in accordance with claim 10 including means biasing said control levers into said first position.

16. In a child's motor powered vehicle, the combination comprising:
A. a body adapted to seat a child with the legs supported thereon;
B. a front wheel assembly;
C. means mounting said front wheel assembly on said body for pivoting about a vertical axis, said first wheel assembly including a vertically extending post centrally of the width of said vehicle, at least one wheel supported for rotation thereon, and means journalling said post in said body for rotation about said vertical axis;
D. a rear axle supported on said body;
E. rear wheels rotatably supported on said axle, said rear wheels each having a drive portion including a generally annular channel extending coaxially about said axle, said channels each being defined by a base wall and opposed, axially extending walls;
F. a drive shaft supported on said body in spaced relationship to said rear axle and generally parallel thereto in its at rest position;
G. drive members on the ends of said drive shaft for rotation therewith and disposed within said annular channels of said rear wheels, said drive elements being of a diameter less than the radial width of said channels, said drive elements and channel walls having cooperating surfaces to effect driving engagement therebetween upon surface engagement thereof;
H. power means for effecting rotation of said drive shaft in one direction of rotation, said power means including an unidirectional electric motor supported on said drive shaft and engaged therewith to effect its rotation;
I. a pair of control levers extending upwardly of said body and pivotably mounted thereon adjacent their lower ends, said control levers each being engageable with an end portion of said drive shaft upon pivoting of said levers from a first position to a second positions which effects movement of the respective drive shaft end portions and the drive elements carried thereby from engagement with one axially extending wall of the channel of the adjacent rear wheel and into engagement with the other axially extending wall of said drive channel, said drive shaft and thereby said electric motor being supported on said control levers, whereby pivoting of the control levers from one position to another will effect a change in direction of rotation of that rear wheel and positioning of the two control levers to effect engagement of the drive elements with opposite walls of said channel will effect rotation of the rear wheels in opposite directions and turning of the vehicle, and whereby positioning of the control levers to effect engagement of the drive elements with the same channel walls will effect generally straight line motion of the vehicle forwardly and rearwardly.

17. The vehicle in accordance with claim 10 wherein said axially extending walls of said channel have axially extending teeth about the periphery thereof.

18. The vehicle in accordance with claim 17 wherein said drive members have cooperatively dimensioned and configured axially extending teeth about the periphery thereof.

19. The vehicle in accordance with claim 16 including means biasing said control levers into said first position.

* * * * *

UNITED STATES PATENT AND TRADEMARK OFFICE
CERTIFICATE OF CORRECTION

PATENT NO. : 4,516,648
DATED : May 14, 1985
INVENTOR(S) : Berger, Hans S. et al

It is certified that error appears in the above—identified patent and that said Letters Patent is hereby corrected as shown below:

Column 10, line 40, change "10" to -- 16--.

*Signed and Sealed this*

*Twenty-fourth* Day of *September 1985*

[SEAL]

*Attest:*

DONALD J. QUIGG

*Attesting Officer*  *Commissioner of Patents and Trademarks—Designate*